May 8, 1934.  A. W. GUSTAFSON  1,957,712
COMBINATION AUTO DRIVEN CAR AND TRUCK
Filed Sept. 3, 1932
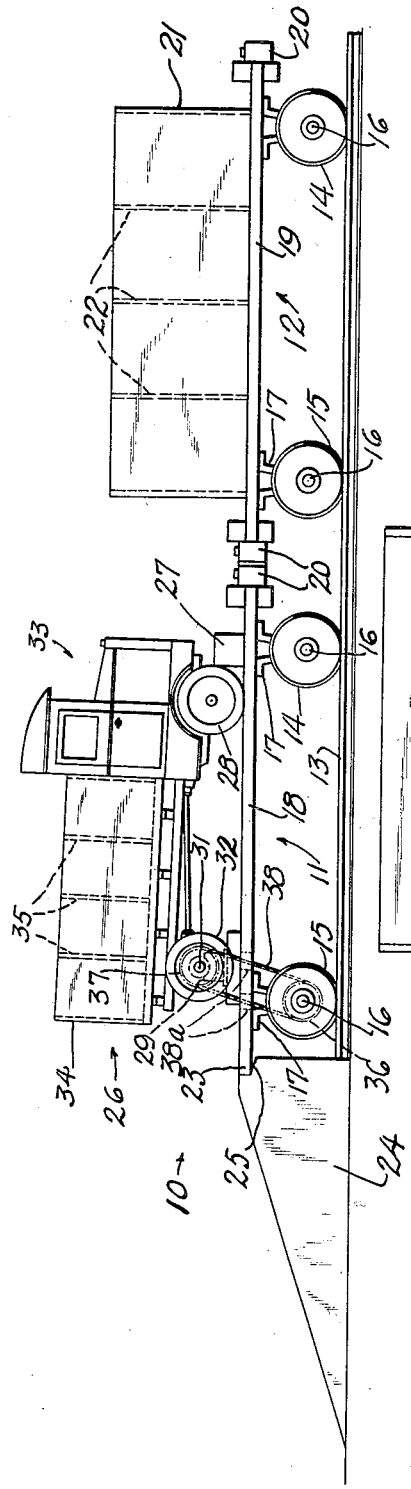
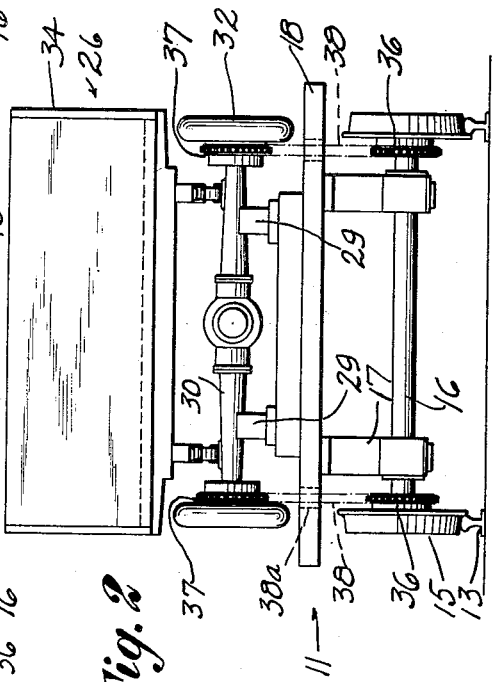
INVENTOR
Albert W. Gustafson
BY
Louis Schumacher
ATTORNEY Patented May 8, 1934

1,957,712

UNITED STATES PATENT OFFICE 1,957,712

COMBINATION AUTO DRIVEN CAR AND TRUCK

Albert W. Gustafson, Jersey City, N. J.

Application September 3, 1932, Serial No. 631,599

4 Claims. (Cl. 105—159)

This invention relates to combination auto driven cars and trucks.

The object of this invention is to provide a simple, practical means whereby the railroads can compete with motor trucks. There are many towns which have no direct communication with railroads, and hence I provide a series of ordinary flat or other rail cars, and a motor truck which may be movable upon a flat car and connected thereto so as to drive the rail cars. At a suitable point, the motor truck may be disengaged and removed from the rail car and used to make delivery to a nearby town or to collect commodities to be delivered elsewhere, while the rail cars remain stationary until the motor truck is replaced on one of them, reengaged and caused to drive the rail cars to the next desired point.

Another object of the invention is the provision of improved means whereby the motor truck and rail car can be quickly coordinated in an operative unit, and disengaged to function individually.

A further object of the invention is to furnish an improved method and means of transportation, the means referred to having few and simple parts, and permitting the use of relatively standard rail cars and trucks, and which is durable, convenient, reliable and efficient to a high degree in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a view in side elevation showing a device embodying the invention.

Fig. 2 is a view in end elevation thereof with an element removed.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Referring in detail to the drawing, 10 denotes a device embodying the invention. The same may include a plurality of conventional rail cars such as 11 and 12, adapted to travel on rails 13 of any suitable or standard gage. It will ordinarily suffice that these rail cars shall be preferably of light construction that is sufficiently strong for the intended purpose. Thus each car may include a plurality of front and rear wheels 14 and 15 respectively, mounted on axles 16 which may be journaled in brackets such as 17 that may be secured to the underside of the floors of the cars, such as 18, 19. The cars may have suitable couplings 20, of which the car 11 may have one at its forward end, and the car 12 at both ends, so that other cars may be connected thereto as may be desired. The invention may be best understood by considering the car 11 as a flat car and the car 12 as a box type car. Thus the latter may have a wall or box structure 21, which may preferably be divided as by transverse partitions 22 to provide a plurality of compartments for improved coordination with other compartments of the motor truck as will be described hereinafter.

The flat car 11 has its floor provided with a uniform end 23 adapted to be backed against a suitable ramp 24 that may be movable but is preferably in stationary relation to the rails 13 which may constitute a siding. If desired, said ramp may have a longitudinal recess or inclined undercut 25 adapted to receive the edge 23 of the truck floor and support the same. By means of this ramp, an automobile or other motor truck 26 can be caused to ride up onto the flat car. For this purpose, the floor 18 may be suitably constructed to accommodate or guide the wheels of the motor truck, but it will, in general, suffice to make said floor flat, and to provide the same at its front end with suitable stops such as 27 adapted to abut the front idler steering wheels 28 of the motor truck. At the other end of the flat car, the same may have an elevating means such as a plurality of spaced jacks 29 adapted to engage any suitable frame portion of the motor truck, such as the housing 30 for the rear axle 31 on which the wheels 32 are mounted. The function of these jacks will be later described.

The motor truck 26 may be of any well known type. It may include the usual motor and transmission (not shown) for driving the rear axle 31 and wheels 32. It may also have a front operator's compartment 33, and a body 34. The latter may be divided as by transverse partitions 35 into a series of compartments coordinated with those of the car 12.

In order to drive the flat car 11 by means of the power of the motor truck 26, any suitable disengageable transmission may be provided. Thus the axle 16 may have one or more sprocket gears 36 and the motor truck may have one or more sprocket gears 37. The latter may be suitably mounted on a desired side of the wheels 32 as by being secured thereto or to the shaft 31. The sprocket gears of the motor truck and flat car are positioned in planes, and may be interconnected by sprocket chains 38. The latter may extend through openings 38a in floor 18, and may be adapted to be split or otherwise removable. When the motor truck is located on the flat car 11 in operating condition, the rear end thereof is elevated by the jacks 29 so as to lift the wheels 32 above the floor 18 and to render the sprocket chains taut. The sprocket chains may for this purpose be initially sufficiently loose, and hence they can be easily applied and removed from the sprockets when the jacks are lowered. The latter may also rigidly engage and hold the truck when the latter is elevated thereon.

The manner of using the invention will now be described. The commodities may be placed in different compartments of the box car 12 according to the localities to which they are to be shipped, and the cars 11 and 12 are coupled together. Then the motor truck 26 is driven up a ramp onto the flat car 11 against stops 27, the sprocket chains are applied, and the jacks 29 operated to elevate the rear end of the motor truck. The cars may now be driven along the rails 13 by the power of the motor truck. At a given destination, the cars may be backed onto a siding against a ramp 24, the jacks lowered, sprocket chains removed, and the motor truck driven down on the ground. The compartments of the motor truck may now be loaded from the proper compartment of the box car 12, and the goods being further segregated in different compartments of the motor truck according to the different adjacent localities to which the goods are to be delivered. Similarly the different compartments of the motor truck can be loaded with goods to be shipped from said localities, which goods can be properly sorted out into different compartments of the box car 12 when the motor truck returns. The latter is again run up on the flat car and reconnected thereto, the operation described being repeated at the next destination.

By this invention, a single motor will drive a plurality of cars. This motor can be of standard make, and can be easily taken care of, and the truck can be conveniently housed in a garage independently of the rail cars. The transmission of the motor truck need not be disconnected and may be manipulated in the usual manner, so that the motor truck is at all times a complete operative unit.

It will be appreciated that various changes and modifications may be made in the device as shown in the drawing, and that the same is submitted in an illustrative and not in a limiting sense, the scope of the invention being defined in the following claims.

I claim:

1. A transportation unit having a motor truck provided with front idler wheels and rear drive wheels, a flat rail car having a plane relatively unobstructed floor affording a driveway whereby the truck can be driven along said floor under its own power, said rail car and said truck having sprockets rotatably associated with their respective rear wheels, and jack means on said floor spaced from said driveway and having saddle means engaging solely under the truck adjacent to the rear drive wheels thereof, the truck being continuously carried on the jack means with the front idler wheels continuously resting on the floor of the rail car, stops for the front wheels, said jack means elevating the rear drive wheels above said floor to rotate out of contact therewith, and a sprocket chain having sufficient preformed slack for releasably interconnecting said sprockets and to permit the rear drive wheels of the truck to be elevated, said sprocket chain being taut in the elevated position of the rear end of the truck and being continuously so maintained by operation of the jack means, with the sprocket chain extending approximately vertically and causing the rail car to be driven coincidentally with the rear drive wheels of the motor truck.

2. A transportation unit having a motor truck having a rear axle housing and rear drive wheels, a rail car having a flat relatively unobstructed floor providing a driveway whereby the truck can be driven along said floor under its own power, said rail car having a drive sprocket and the rear axle of the truck having a normally idle sprocket, releasable jack members on the rail car engaging under said axle housing at spaced points therealong for elevating the rear end of the truck so that the rear drive wheels are clear of the rail car floor, said jack members having bases interconnected as a unit and being spaced from and independent of said driveway, a sprocket chain for interconnecting said sprockets in the jack supported position of the truck, and said sprocket chain being disengageable from the sprockets on releasing the jack means to cause the truck to rest wholly on the floor of the rail car.

3. In a transportation unit having a motor truck, a rail car having a support including a substantially horizontal driveway extending continuously to the rear end of the rail car and along which the truck can be driven by its own power, said truck and car having transmission means whereby the power of the motor truck can be utilized to drive the car, said transmission means including a sprocket chain extending between the car and truck and having a slack for removability whereby the truck can be disengaged from the car, and jack means between the car and truck elevating a portion of the latter to take up the slack in the sprocket chain and render the same taut, said slack being sufficient to permit the truck portion to be elevated out of engagement with said support, and said jack means continuously carrying said truck portion in the taut condition of the sprocket chain.

4. A transportation unit having a motor truck, a rail car having a support including a substantially horizontal driveway extending continuously to the rear end of the rail car along which driveway the truck can be driven by its own power, jack means disposed on said support so as to be cleared by the truck wheels in driving along the driveway, the truck and the car having transmission means whereby the power of the truck can be utilized to drive the car, said transmission means including a detachable member extending between the truck and the car, the jack means being operable to elevate the truck for idling rotation of wheels thereof, and the transmission means being operative in said elevated position of the truck, whereby the only power required for manipulating the unit, beyond the power of the truck, is the power necessary for the jack means.

ALBERT W. GUSTAFSON.